United States Patent [19]

Rembold

[11] 3,854,287

[45] Dec. 17, 1974

[54] SELF-TRIMMING CONTROL FOR TURBOFAN ENGINES

[75] Inventor: John P. Rembold, Juno Isles, Fla.

[73] Assignee: United Aircraft Corporation, East Hartford, Conn.

[22] Filed: Dec. 26, 1973

[21] Appl. No.: 427,754

[52] U.S. Cl.............. 60/236, 60/238, 60/239, 60/242, 60/243, 60/39.16 R, 60/39.28 T
[51] Int. Cl.......... F02c 3/06, F02c 9/04, F02k 3/06
[58] Field of Search........ 60/39.28 R, 39.28 T, 243, 60/236, 39.16 R, 39.16 C, 226 R

[56] References Cited
UNITED STATES PATENTS

| 3,187,504 | 6/1965 | Herbert et al.............. | 60/39.28 R |
| 3,606,754 | 9/1971 | White....................... | 60/39.16 R |
| 3,738,102 | 6/1973 | Stearns et al.............. | 60/39.28 T |
| 3,797,233 | 3/1974 | Webb et al................. | 60/226 R |

Primary Examiner—Carlton R. Croyle
Assistant Examiner—Robert E. Garrett
Attorney, Agent, or Firm—Donald F. Bradley

[57] ABSTRACT

A twin spool turbofan engine control is designed which maintains engine thrust and stall margin at nominal levels as the operating characteristics of the engine high spool deteriorates with operating hours, increased altitude or increased power extraction. An electronic supervisory control monitors the high rotor speed and the fan turbine inlet temperature relationships for all engine power settings from intermediate to maximum, and the electronic supervisory control schedules are adjusted based upon shifts in the relationships. In one embodiment the fuel flow to the engine is trimmed in response to a desired fan turbine inlet temperature schedule determined as a function of engine inlet temperature and main burner pressure, the schedule being modified in response to the difference between operating high rotor speed and a reference rotor speed which in turn is a function of engine inlet temperature. In another embodiment the engine fuel flow is trimmed in response to a high rotor speed schedule determined as a function of engine inlet temperature and biased by the difference between a sensed fan turbine inlet temperature and a reference fan turbine inlet temperature. In both embodiments the area of a variable geometry nozzle in the engine is trimmed to modify the fan airflow.

8 Claims, 6 Drawing Figures

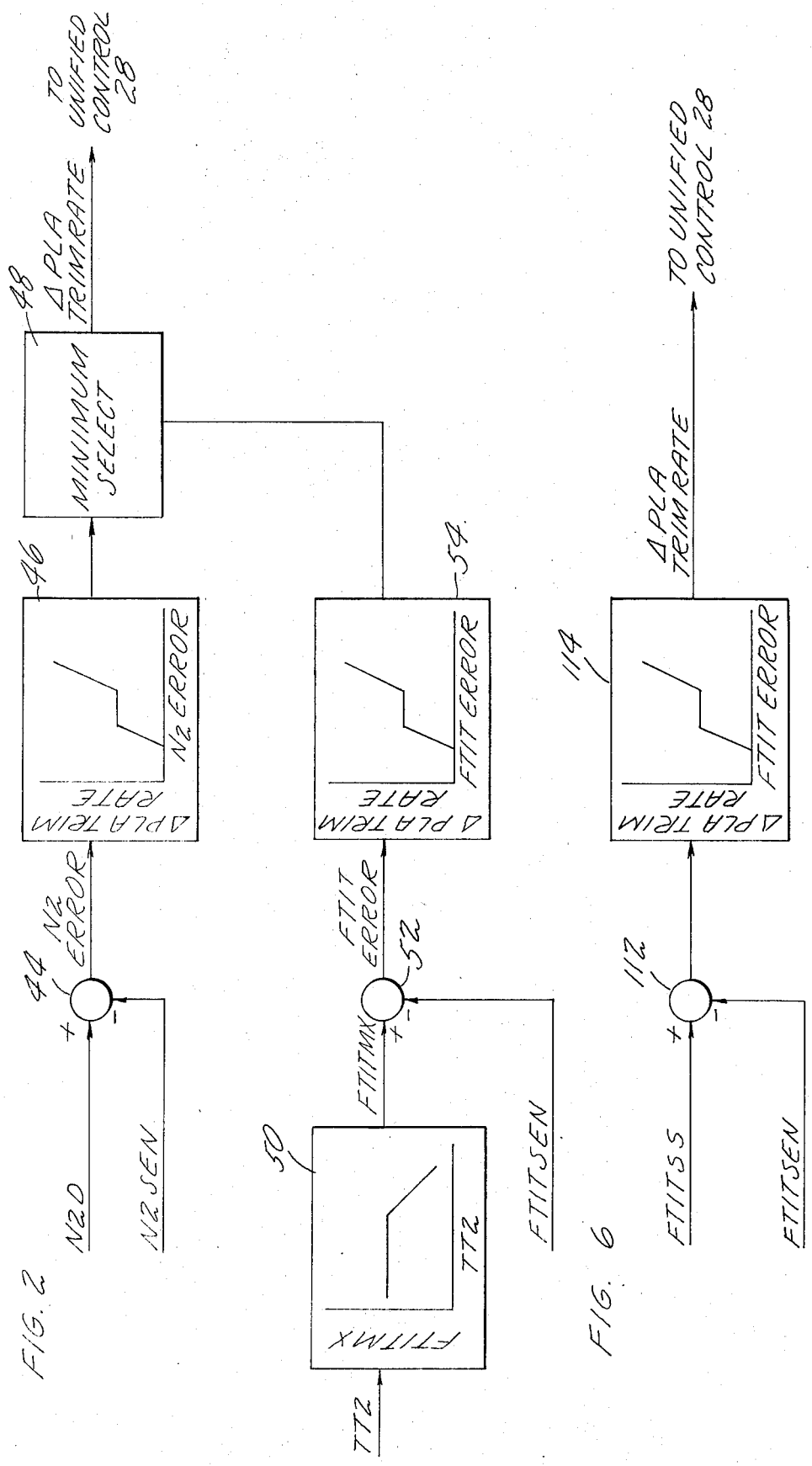

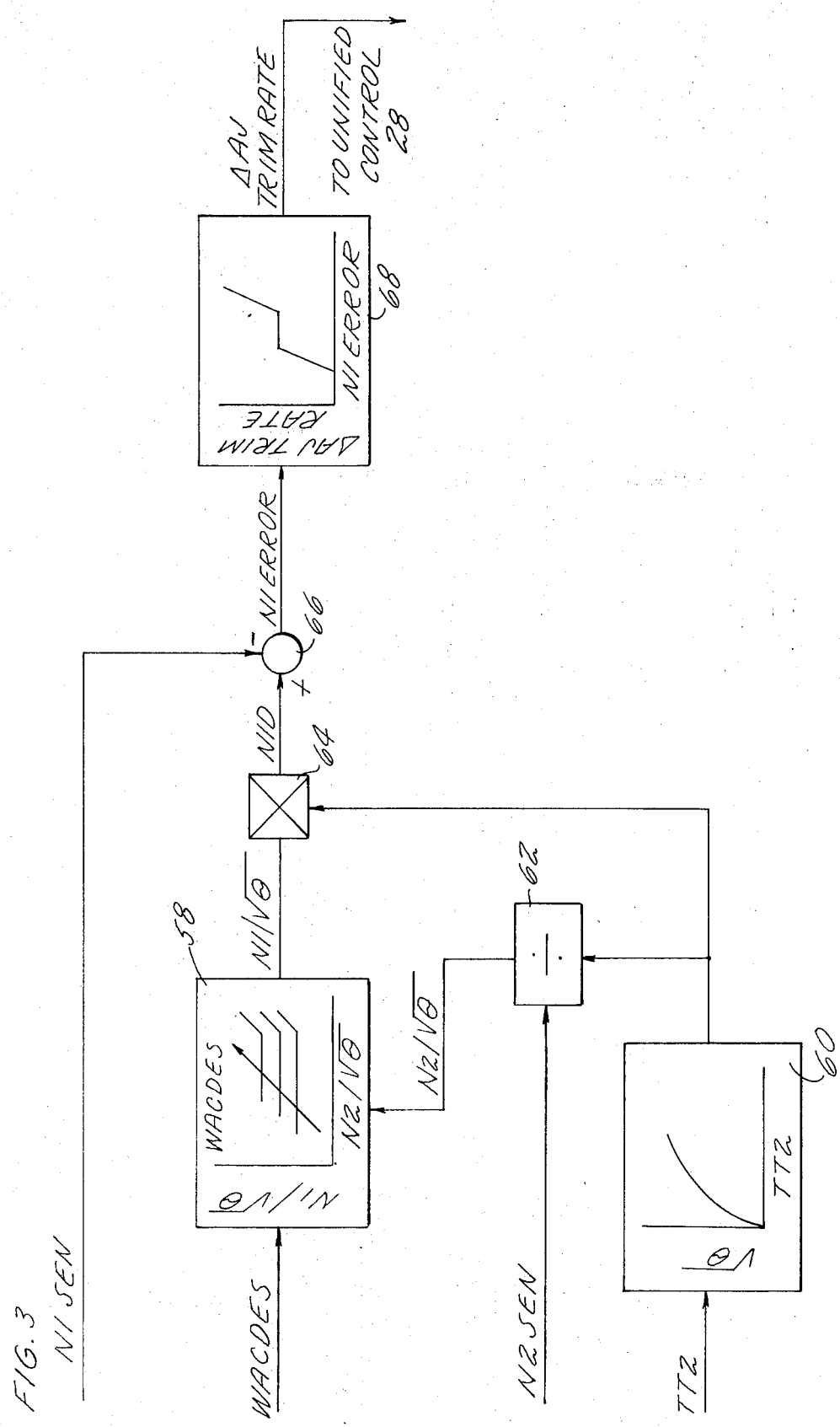

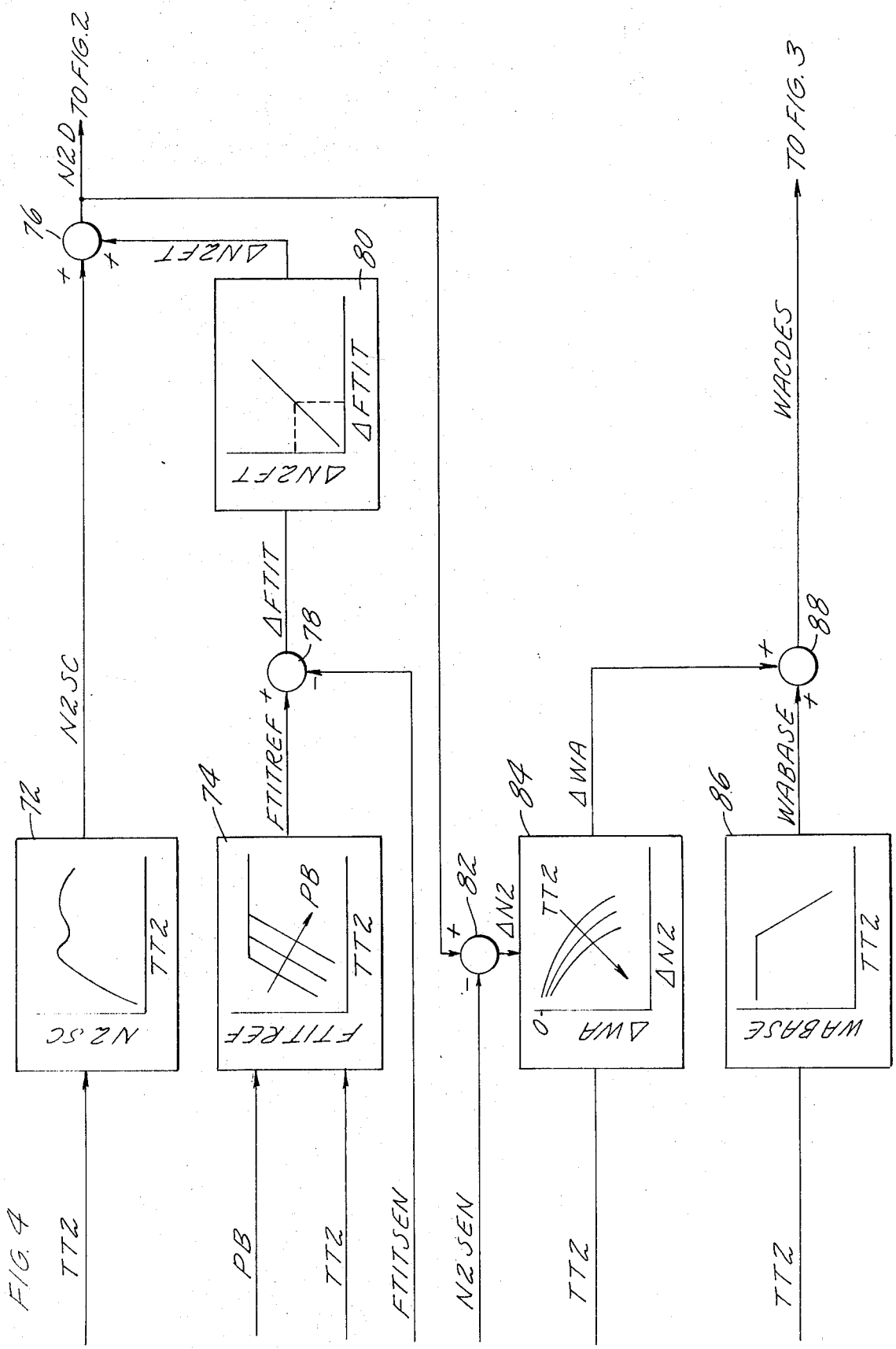

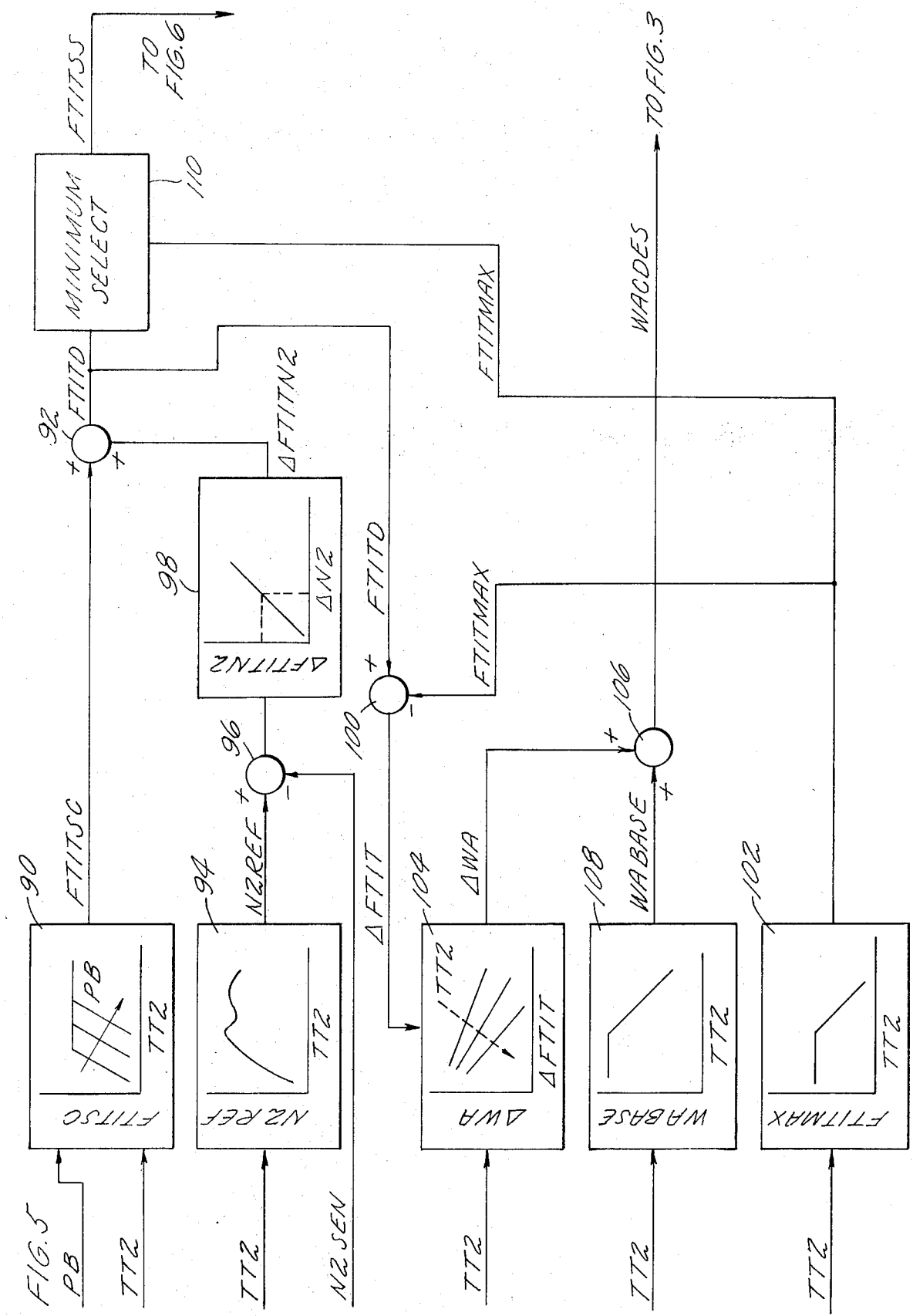

SELF-TRIMMING CONTROL FOR TURBOFAN ENGINES

The invention herein described was made in the course of or under a contract or subcontract thereunder with the Department of the Air Force.

BACKGROUND OF THE INVENTION

1. Field of the Invention

This invention relates to a control system for a twin spool turbofan engine, and particularly to a control system which automatically compensates for engine efficiency deterioration, power extraction and increased altitude.

2. Description of the Prior Art

With improvements in turbine engines, particularly those used to power aircraft, complex control systems are required to maintain the numerous engine components and operating parameters within operational limits. Numerous control systems, both hydromechanical and electronic, have been developed which adequately fulfill the requirements of modern aircraft turbine engines.

Experience with advanced engines has shown that deterioration occurs in engine performance not only with the operating hours of the engine, but also during operation at high altitudes and with increases in power extraction. This deterioration is more prevalent in the high spool of the engine than in the low spool, and causes reductions in thrust or fan stall margin.

Prior art engine controls cannot adequately compensate for engine deterioration or other operating conditions which affect the high spool, and hence the engines are operated with reduced fan stall margin or thrust.

The present invention is an improvement in twin spool turbine engine controls, and will maintain adequate thrust and stall margin in the engine even though deterioration in high spool operation has occurred, or when operation occurs at high altitudes or with high power extraction.

SUMMARY OF THE INVENTION

In accordance with the present invention, there is provided a control for a twin spool turbine engine in which changes in the operating characteristics of the high spool are automatically corrected. The basic engine control system is corrected or trimmed in accordance with sensed changes in operating parameters in the engine to provide improved operation. Fuel flow to the engine and the position of the variable geometry exhaust nozzle are varied to maintain engine operation in a regime which will maintain maximum thrust and adequate stall margin.

In a preferred embodiment of the invention the fuel flow to the engine provided by the basic control is trimmed in response to a high rotor speed schedule determined as a function of engine inlet temperature and biased by the difference between a sensed fan turbine inlet temperature and a reference fan turbine inlet temperature. The fan airflow is modified by trimming the variable geometry exhaust nozzle in response to the difference between the scheduled high rotor speed and the actual high rotor speed.

In an alternative embodiment of the invention the fuel flow to the engine provided by the basic control is trimmed in response to a fan turbine inlet temperature schedule determined as a function of engine inlet temperature and burner pressure, the schedule being biased by the difference between operating high rotor speed and a reference high rotor speed determined as a function of engine inlet temperature. The fan airflow is modified by trimming the variable geometry exhaust nozzle in response to the difference between the scheduled fan turbine inlet temperature and a maximum fan turbine inlet temperature.

BRIEF DESCRIPTION OF THE DRAWINGS

FIG. 2 is a schematic block diagram of the fuel trim portion of the basic supervisory turbine engine control which is modified by the present invention.

FIG. 3 is a schematic block diagram of the variable area nozzle trim portion of the basic supervisory turbine engine control which is modified by the present invention.

FIG. 4 is a schematic block diagram of the preferred embodiment of the present invention wherein the fuel trim and variable area nozzle trim signals of FIGS. 2 and 3 are modified.

FIG. 5 is a schematic block diagram of an alternative embodiment of the fuel trim and variable area nozzle trim modifiers of FIG. 4.

FIG. 6 is a schematic block diagram of the fuel trim portion of the supervisory control which is used in place of FIG. 2 when the embodiment of FIG. 5 is used.

DESCRIPTION OF THE PREFERRED EMBODIMENT

Figure 1:
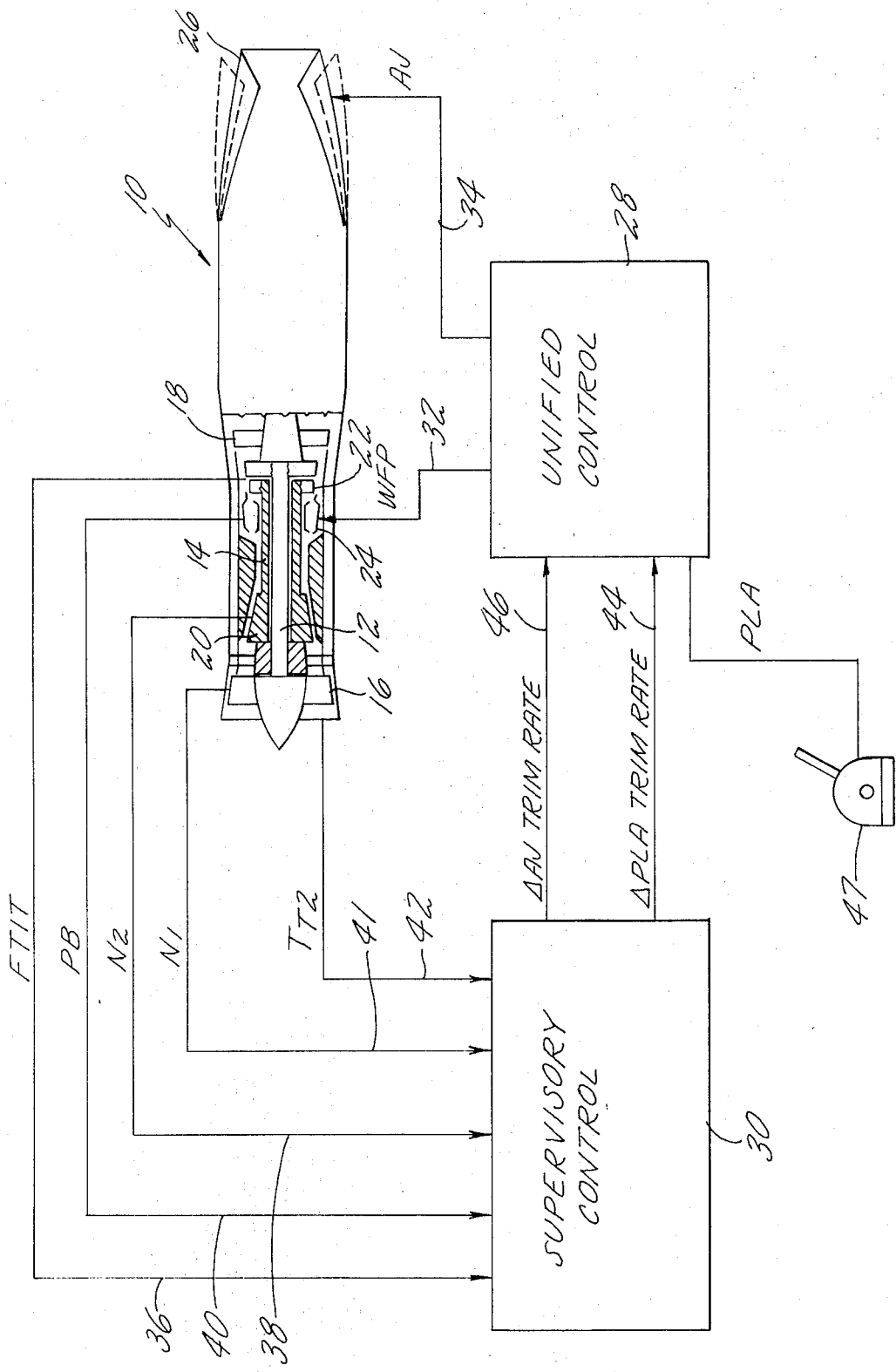
FIG. 1 is a schematic diagram, partially in block diagram form, of a turbine engine control system incorporating the present invention.

Referring to FIG. 1 there is shown a typical twin spool turbofan engine 10 having a low spool 12 and a high spool 14. The front compressor or rotor portion 16 of the low spool is denoted as the fan and is driven by the fan turbine 18 to which it is connected. The compressor or rotor portion 20 of the high spool is driven by the high turbine 22. A plurality of burners 24 to which fuel is supplied provide energy to drive the turbines 18 and 22. The gases which pass through the turbines are expanded through a variable area exhaust nozzle 26 to produce thrust. Other details of construction of the engine 10 are well known to those skilled in the art and will not be described in detail.

Included in typical present-day turbojet engines are a plurality of controllable or variable components such as variable inlets and guide vanes, compressor bleeds, and variable nozzles such as exhaust nozzle 26. The burners 24 are also supplied fuel in a controlled amount by a fuel control which is responsive to selected engine and flight parameters. Because of the complex interrelationships within the engine, any change in one of the engine variables will affect the other variables. To accurately control the engine during its various modes of operation, supervisory and/or unified control systems have been developed which respond to a plurality of sensed engine and flight parameters and produce control signals which accurately regulate the engine variables. The control system may be purely electronic, or may be a combination of a unified hydromechanical control which is trimmed in response to an electronic supervisory control. Computers are often incorporated into the control.

The present invention will be described in terms of a unified hydromechanical control 28 which regulates the engine variables of operation in response to input signals both from selected engine parameters and also from an electronic supervisory control 30, the supervisory control being responsive to selected engine parameters to provide trim signals to the unified control 28. A fully integrated electronic control may also be used to practice the invention.

Since the present invention involves only selected portions of the control, only those inputs to and outputs from the unified control 28 and the supervisory control 30 which are required to describe the invention will be shown, although it should be understood that numerous other functions may be performed by the engine control system.

The fuel supplied to the burners 24 of engine 10 is controlled by an output signal from the unified control 28 shown by signal line 32. The fuel flow is denoted as WFP. Likewise unified control 28 also regulates the position of the variable area nozzle, AJ, via signal line 34. Mechanisms for control of these engine variables are well known in the art.

Electronic supervisory control 30 receives signals indicative of selected engine parameters, viz., a signal indicative of fan turbine inlet temperature (FTIT) is fed via line 36, a signal indicative of high rotor speed ($N_2$) is fed via line 38, a signal indicative of burner pressure (PB) is fed via line 40, a signal indicative of fan rotor speed ($N_1$) is fed via line 41, and a signal indicative of engine inlet temperature (TT2) is fed via line 42. The signals are generated by conventional transducers well known to those skilled in the art.

As will be described subsequently in detail, the supervisory control 30 generates in response to the input signals on lines 36, 38, 40, 41 and 42, trim signals for fuel, $\Delta$PLA trim, and for nozzle area, $\Delta$AJ trim, which are fed from supervisory control 30 to unified control 28 via lines 44 and 46 respectively. The $\Delta$PLA trim and $\Delta$AJ trim signals modify the basic fuel control and nozzle area signals WFP and AJ produced by the unified control 28. Fuel flow to the engine is regulated in response to a power lever 47 which feeds a power lever angle signal PLA to unified control 28.

FIGS. 2 and 3 show respectively the implementation of the $\Delta$PLA trim and $\Delta$AJ trim signals by the supervisory control 30. Referring to FIG. 2, a signal indicative of a desired high rotor speed and designated as N2D is produced and is compared in a comparator 44 with a signal proportional to sensed or actual high rotor speed and designated an N2SEN. This latter signal is equivalent to that sensed on line 38, FIG. 1. Comparator 44 produces an N2 ERROR signal equivalent to the difference between the N2D and the N2SEN signals, and the N2 ERROR signal is fed to a function generator 46 whose output is proportional to a fuel flow trim rate signal designated as $\Delta$PLA trim rate. The function generator 46 and the function generators to be described subsequently may be conventional electronic circuits, but electronic digital computers in which are stored the required function may also be used. The functions therein may be computed from engine operational curves which are available from engine manufacturers.

The $\Delta$PLA trim rate signal produced in function generator 46 is then fed as one input into a minimum selector 48.

A signal indicative of a maximum fan turbine inlet temperature, FTITMX, is produced in a function generator 50 in response to the TT2 signal fed into supervisory control 30 via line 42 of FIG. 1, and is compared in a comparator 52 with a signal designated as FTITSEN and which is equivalent to the signal on line 36 of FIG. 1. The output from comparator 52 is a FTIT ERROR signal which is fed to function generator 54 where a signal also designated as $\Delta$PLA trim rate which is proportional to fuel flow trim rate is produced and fed as a second input to minimum selector 48. The minimum selector passes therethrough the lower of the two $\Delta$PLA trim rate input signals which is fed via line 44 (FIG. 1) to a stepper motor or other control device contained as part of the unified control 28.

FIG. 3 shows the implementation of the variable area nozzle trim signal $\Delta$AJ trim rate generated in supervisory control 30 and fed to unified control 28 via line 46. A signal indicative of desired fan airflow, WACDES, is produced as will be described subsequently in detail, and the signal is fed to a bivariant function generator 58. The engine inlet temperature signal TT2 is fed to a function generator 60 from which a signal proportional to an airflow parameter $\sqrt{\theta}$ is produced. $\theta$ is defined as TT2 in degrees Rankine divided by standard day temperature (518.7°R). The $\sqrt{\theta}$ signal is fed as one input to divide network 62 to which a signal proportional to the sensed high rotor speed N2SEN is also fed. The divide circuit performs a mathematical division function, dividing N2SEN by $\sqrt{\theta}$ and feeding the resulting $N2/\sqrt{\theta}$ signal as a second input to bivariant function generator 58. The output from function generator 58 is a signal indicative of the parameter $N1/\sqrt{\theta}$ which is defined as corrected fan speed.

The $N1/\sqrt{\theta}$ signal from function generator 58 is fed to multiplier network 64 where it is multiplied by the $\sqrt{\theta}$ signal produced by function generator 60. The multiplication results in a signal equivalent to the desired low rotor or fan speed which is denoted as N1D.

A signal proportional to actual fan rotor speed and denoted as N1SEN is produced and is fed to a comparator 66 where it is compared with the N1D signal from multiplier 64, the difference therebetween shown as the N1 ERROR signal being fed to function generator 68 where a signal proportional to variable area nozzle trim $\Delta$AJ trim rate is produced. The $\Delta$AJ trim rate signal is fed to a stepper motor or other control device in unified control 28 of FIG. 1 as shown by signal line 46 of FIG. 1.

As shown in FIGS. 2 and 3 the unified control 28 and supervisory control 30 coact to vary the engine exhaust nozzle area 26 to control fan rotor speed. The fuel flow to the engine burners is scheduled initially by the PLA signal fed to unified control 28 from power lever 47, the primary fuel flow signal WFP on line 32 being modified by the $\Delta$PLA trim rate signal on line 44 to maintain either a desired high rotor speed N2 or a desired fan turbine inlet temperature FTIT. The selection is made by the minimum selector 48 of FIG. 2. At low engine inlet temperatures (TT2) the fuel flow is varied to maintain desired high rotor speed N2, while at high engine inlet temperatures the desired fan turbine inlet temperature, FTIT becomes the controlling parameter. The temperature at which the transition occurs from controlling high rotor speed N2 to controlling fan turbine inlet temperature FTIT is a function of the engine configuration.

As implemented in FIGS. 2 and 3 the area of the exhaust nozzle 26 sets the rotor speed of the fan (N1) and the primary fuel flow sets the fan pressure ratio. Changes to the N2 or FTIT schedule will change the fan pressure ratio. Since fan pressure ratio is directly related to nozzle pressure ratio at a given flight or operational condition, fan pressure ratio has a direct impact on thrust. As pressure ratio increases, thrust increases. However, pressure ratio must be limited to insure adequate fan stall margin over the flight envelope. Therefore, these two considerations, stall margin and thrust, establish a desired fan operating line. Deviations from this line on either side are undesirable.

High spool deterioration, high altitude flight and high spool power extraction have a direct impact on the fan pressure ratio. Because fan rotor speed (low rotor speed) is held constant at a given flight condition by the variable area exhaust nozzle 26, fan pressure ratio is proportional to fan turbine power. Fan turbine power is proportional to fan turbine inlet temperature FTIT times fan turbine airflow. If fan turbine power increases, fan pressure ratio increases. At a constant high rotor speed N2, an engine with a deteriorated high spool will run at a higher fan turbine inlet temperature and increased fan turbine power, while at a constant fan turbine inlet temperature a deteriorated high spool results in a lower high rotor speed and reduced fan turbine power. The result of high spool deterioration when running to the N2 schedule (at low TT2's) is to increase fan turbine power and therefore to increase fan pressure ratio with a corresponding decrease in stall margin. When running to the FTIT schedule (at high TT2's), high spool deterioration reduces fan turbine power and therefore fan pressure ratio and thrust. High spool deterioration consequently affects stall margin or thrust on whichever schedule, N2 or FTIT, is controlling.

Considerable improvement in engine operation is provided by trimming the basic engine control described previously to make it insensitive to high spool deterioration. In essence the present invention monitors the N2/FTIT relationship for all power settings from intermediate to maximum and adjusts the supervisory control trim signals based on shifts in this relationship. A comparison is made between nominal levels and operating levels of N2 and FTIT, and if a difference occurs the ΔPLA trim rate and ΔAJ trim rate signals appearing on lines 44 and 46 are modified accordingly. For low TT2's a constant fan pressure ratio is scheduled by maintaining proper fan turbine power, while at for higher TT2's and after the limiting turbine temperature is reached, the basic airflow schedule is trimmed to hold the desired fan operating line.

FIG. 4 shows the preferred implementation of the control schedule of the present invention. Engine inlet temperature signals (TT2) are fed to function generators 72 and 74, and a burner pressure signal PB is also fed to function generator 74. The output from function generator 72 is a signal equivalent to a scheduled high rotor speed N2 and is denoted as N2SC. The N2SC signal is fed to summing junction 76.

The output from bivariant function generator 74 is a signal proportional to a reference fan turbine inlet temperature signal and is denoted as FTITREF. The FTITREF signal is fed to comparator 78, where it is compared with a sensed fan turbine inlet temperature signal which is denoted as FTITSEN and which is equivalent to the FTIT signal on line 36 of FIG. 1. The output from comparator 78, a fan turbine inlet temperature error signal ΔFTIT, is then fed to a function generator 80 which schedules a high rotor speed error signal denoted as ΔN2FT which is in turn added to the N2SC signal in adder 76. The resulting N2D signal produced in adder 76 is equivalent to desired high rotor speed and is fed as the input to the comparator 44 of FIG. 2.

The desired high rotor speed signal N2D is also fed as in input to a comparator 82 in FIG. 4 where it is compared with the sensed high rotor speed signal N2SEN to produce a high rotor speed error signal ΔN2. The ΔN2 signal and the engine inlet temperature signal TT2 are fed to bivariant function generator 84 to schedule a fan airflow trim signal ΔWA. The primary fan airflow schedule is generated in function generator 86 by engine inlet temperature TT2 and is shown as WABASE. The WABASE signal from function generator 86 is fed to adder network 88 where the fan airflow trim signal ΔWA is also added, resulting in the desired fan airflow signal WACDES fed as an input to function generator 58 of FIG. 3.

An alternative embodiment of the control schedule of the present invention is shown in FIG. 5. This alternative embodiment is operationally identical with that of FIG. 4, and the same engine performance will be achieved with either system. Briefly, the implementation of FIG. 5 modifies FTIT based on an N2 difference rather than modifying N2 based on an FTIT difference. Also, the resulting desired fan turbine inlet temperature is compared to a maximum fan turbine inlet temperature, and if the desired fan turbine inlet temperature is greater, fan airflow is reduced from the nominal schedule as a function of TT2.

Referring to FIG. 5, bivariant function generator 90 receives inputs of main burner pressure PB and engine inlet temperature TT2 and generates a scheduled fan turbine inlet temperature signal FTITSC which is fed to adder 92. The TT2 signal fed to function generator 94 schedules an N2 reference signal N2REF which is fed to comparator 96 where it is compared with sensed high rotor speed signal N2SEN, comparator 96 producing an N2 error signal denoted as ΔN2. The ΔN2 signal is then fed to a function generator 98 where a fan turbine inlet temperature adjustment signal ΔFTITN2 is scheduled and added to the FTITSC signal in adder 92. The output from the adder 92 is a desired fan turbine inlet temperature signal FTITD.

The desired fan turbine inlet temperature signal FTITD is fed as an input to a comparator 100 and compared with a maximum fan turbine inlet temperature signal FTITMAX scheduled in function generator 102 by TT2. The output from comparator 100 is a fan turbine inlet temperature error signal ΔFTIT which is fed as an input to bivariant function generator 104 together with a TT2 signal. The output from function generator 104 is an airflow modifying signal ΔWA which is added in adder 106 to the basic airflow signal WABASE scheduled in function generator 108 by TT2. The output from adder 106 is the desired fan airflow signal WACDES used as the input to function generator 58 of FIG. 3.

The desired fan turbine inlet temperature signal FTITD and the maximum fan turbine inlet temperature signal FTITMAX are both fed to a minimum select circuit 110 and the lower signal, i.e., that one calling for the lower temperature, is passed through the minimum selector 110. The output from the minimum selector is denoted as FTITSS.

When using the embodiment of FIG. 5, the control of FIG. 2 may be replaced with the simplified control of FIG. 6 in which the FTITSS signal is fed to a comparator 112 and compared with the sensed fan turbine inlet temperature signal FTITSEN, the resulting FTIT error signal scheduling the PLA trim rate signal in function generator 114.

While the present invention has been described in terms of its preferred embodiment, it is apparent that modifications may be made to the schedules and components described herein without departing from the scope of the invention as hereinafter claimed.

I claim:

1. In a control for a twin spool turbine engine having an inlet, a low pressure rotor and a high pressure rotor each having a turbine driven compressor, a burner to which fuel is supplied for driving said turbines, and a variable area exhaust nozzle, means responsive to selected engine operating conditions for maintaining a desired relationship between parameters of low pressure turbine inlet temperature and high pressure compressor speed including means for generating a first signal indicative of a scheduled operating limit for one of said parameters, means responsive to selected engine operating conditions for generating a second signal indicative of a reference value for the other of said parameters, means for measuring the actual value of said other parameter and producing a third signal indicative thereof, means for comparing said second and third signals and producing therefrom an error signal proportional to the difference therebetween, means responsive to said error signal for scheduling a trim signal, means for adding said trim signal to said first signal to produce a fourth signal indicative of the desired value of said one parameter, and means for trimming the flow of fuel to said burner in response to said fourth signal.

2. In a control for a twin spool turbofan engine having an inlet, a high pressure rotor and a low pressure rotor each having a turbine driven compressor, said low pressure compressor including a fan stage, a burner to which fuel is supplied for driving said turbines, and a variable area exhaust nozzle, means responsive to the engine inlet temperature for generating a first signal indicative of a scheduled operating limit for the speed of said high pressure compressor, means responsive to the engine inlet temperature and the pressure of said burner for generating a second signal indicative of a reference value for the inlet temperature of said fan turbine, means for measuring the actual fan turbine inlet temperature and generating a third signal indicative thereof, means for comparing said second and third signals and producing an error signal indicative of the difference therebetween, means responsive to said error signal for scheduling a high compressor speed trim signal, means for adding said high pressure compressor trim signal to said first signal to produce a fourth signal indicative of the desired high pressure compressor speed, and means for trimming the flow of fuel to said burner in response to said fourth signal.

3. A control as in claim 2 and further including means for measuring the actual high pressure compressor speed and generating a fifth signal indicative thereof, means for comparing said fourth and fifth signals to produce a high pressure rotor speed error signal, means for generating a signal indicative of a maximum fan turbine inlet temperature, means for comparing said maximum fan turbine inlet temperature signal with said third signal to produce a fan turbine inlet temperature error signal, and a minimum selector receiving said high pressure rotor speed error signal and said fan turbine inlet temperature signal and passing therethrough to said fuel trimming means the one of said received signals indicative of the lower fuel flow.

4. A control as in claim 3 and further including means responsive to the engine inlet temperature for producing a signal indicative of a scheduled fan airflow, means responsive to said high pressure compressor speed error signal and to said engine inlet temperature for scheduling a fan airflow trim signal, means for adding said scheduled fan airflow trim signal to said scheduled fan airflow signal to produce a desired fan airflow signal, and means for trimming the position of said variable area exhaust nozzle in response to said desired fan airflow signal.

5. In a control for a twin spool turbofan engine having an inlet, a high pressure rotor and a low pressure rotor each having a turbine driven compressor, said low pressure compressor including a fan stage, a burner to which fuel is supplied for driving said turbines, and a variable area exhaust nozzle, means responsive to the engine inlet temperature and to the pressure in said burner for generating a first signal indicative of a scheduled operating limit for the inlet temperature of said fan turbine, means responsive to the engine inlet temperature for generating a second signal indicative of a reference value for the speed of said high pressure compressor, means for measuring the actual high pressure compressor speed and generating a third signal indicative thereof, means for comparing said second and third signals and producing an error signal indicative of the difference therebetween, means responsive to said error signal for scheduling a fan turbine inlet temperature trim signal, means for adding said fan turbine inlet temperature trim signal to said first signal to produce a fourth signal indicative of the desired fan turbine inlet temperature, and means for trimming the flow of fuel to said burner in response to said fourth signal.

6. A control as in claim 5 and further including means responsive to the engine inlet temperature for generating a signal indicative of a maximum permissible fan turbine inlet temperature, a minimum selector receiving said fourth signal and said maximum permissible fan turbine inlet temperature signal and passing therethrough the one of said received signals indicative of the lower fuel flow, means for measuring the actual fan turbine inlet temperature and generating a signal indicative thereof, means for comparing the signal passed through said minimum selector with said actual fan turbine inlet temperature signal to produce a fan turbine inlet temperature error signal, and means for feeding said fan turbine inlet temperature error signal to said fuel flow trimming means 7. A control as in claim 6 and further including means for comparing said maximum permissible fan turbine inlet signal with said fourth signal to produce a fifth signal proportional to the difference therebetween, means for generating in response to the engine inlet temperature a signal indicative of a fan airflow, means responsive to said fifth signal and to the engine inlet temperature for scheduling a fan airflow trim signal, means for adding said scheduled fan airflow trim signal to said scheduled fan airflow signal to produce a desired fan airflow signal, and means for trimming the position of said variable area exhaust nozzle in response to said desired fan airflow signal.

8. In control for a twin spool mixed flow turbofan engine having a low pressure spool and a high pressure spool, each of said spools including a rotor and a turbine, said control generating in response to selected input signals a fuel flow signal for varying the flow of fuel to said engine and a nozzle area signal for varying the area of the engine exhaust nozzle, the improvement consisting of apparatus for modifying said fuel flow signal and said nozzle area signal to maintain engine thrust and stall margin at desired levels with changes in the operating characteristics of said high pressure spool comprising means for scheduling in response to engine inlet temperature and engine burner pressure a first signal indicative of a desired relationship between high pressure rotor speed and the temperature at the inlet to said low pressure turbine, means for producing a signal indicative of one of said high pressure rotor speed or low pressure turbine inlet temperature signals in said engine and modifying said first signal in response thereto, means for varying said fuel flow signal in response to said modified first signal, means for scheduling in response to engine inlet temperature a second signal indicative of desired engine airflow, means responsive to said modified first signal for biasing said second signal, and means responsive to said biased second signal for varying said nozzle area signal.

* * * * *